Figure 1:
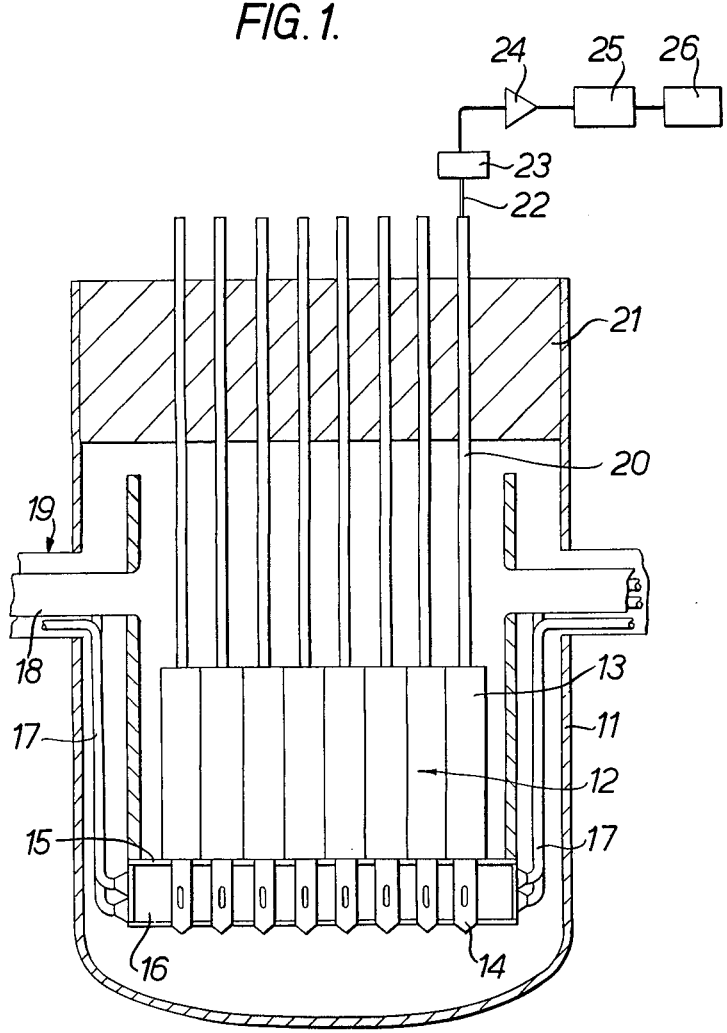

March 15, 1966  T. J. LEDWIDGE  3,240,674
DETECTION OF LIQUID BOILING IN A REACTOR
Filed Oct. 14, 1963  2 Sheets-Sheet 1

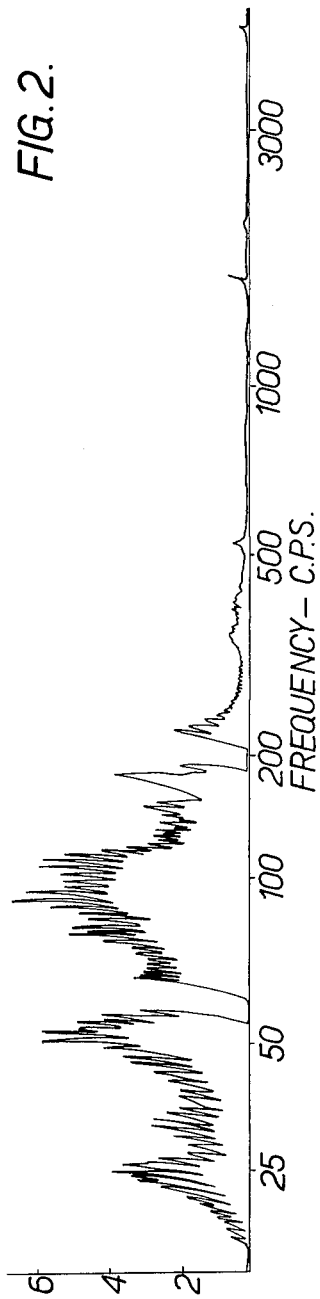
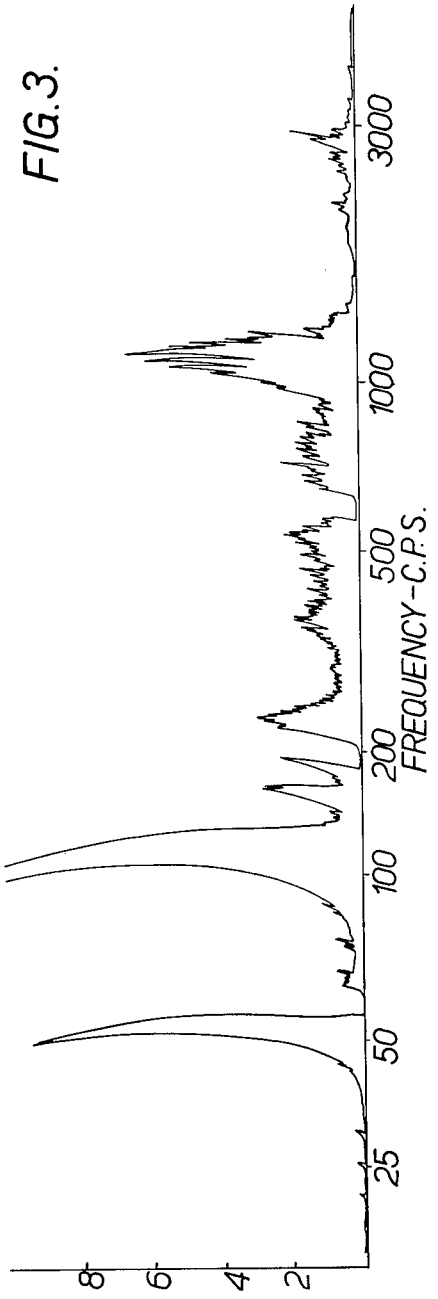

United States Patent Office 3,240,674
Patented Mar. 15, 1966

3,240,674
DETECTION OF LIQUID BOILING IN A REACTOR
Thomas J. Ledwidge, Thurso, Caithness, Scotland, assignor to United Kingdom Atomic Energy Authority, London, England
Filed Oct. 14, 1963, Ser. No. 315,848
Claims priority, application Great Britain, Oct. 15, 1962, 39,015/62
2 Claims. (Cl. 176—19)

The present invention relates to monitoring liquids for the onset of boiling. An aim of the invention is to provide an immediate indication of the first symptoms of boiling.

For a known liquid subject to a given pressure condition, the temperature of the liquid can be measured for the purpose of establishing whether or not the boiling point has been reached. However, this procedure suffers from the disadvantages that the registration of a temperature change usually lags slightly behind the actual change, and that the change so registered is specific only to those regions where the measurement is being taken; thus it is impossible by any temperature measuring technique to ascertain the temperature at every point in a large bulk of liquid if the distribution is not uniform. The situation may therefore arise that boiling commences at one point in the bulk while the temperature taken at other points is below the relevant boiling point.

Non-uniform temperature distribution occurs for example in liquid receiving heat from a nuclear reactor core, that is to say, liquid contained for the time being in the same vessel as the core. A particular case in point is a nuclear reactor which is cooled by liquid metal; in this case there are narrow channels formed between fuel rods for the flow of coolant through the core. If, in operation of the reactor, the flow through such a channel becomes seriously obstructed, as by the lodging therein of solid matter entrained with the coolant, the adjacent fuel may be starved of sufficient cooling and so tend to overheat. In turn, this may lead to fuel melting and a consequent re-distribution of the critical mass.

According to the present invention, in a nuclear reactor of the kind having a liquid-cooled core contained within a vessel, there is provided for the detection of channel blockage a coolant boiling monitor which comprises a sound guide penetrating the vessel and extending to a point submerged in liquid coolant in the region of the core, an electro-acoustic transducer coupled to the sound guide externally of the vessel, and means connected to the transducer for registering the transducer output. This invention utilises the finding that, in a given liquid metal, a spectrum of detectable sonic waves is generated by the formation of bubbles (as distinct from eruption of the bubbles at a free surface). By monitoring selectively a spectrum peak which is unique in relation to background noise of competitive strength it is possible to detect the small bubbles formed in the phase known as "nucleate boiling" which occurs as a preliminary to bulk boiling. Thus, an increase of the sonic energy in a selected frequency band affords the earliest possible indication of boiling anywhere in the liquid.

In a nuclear reactor, say a fast reactor cooled by a liquid metal such as sodium or an alloy thereof with potassium, the output derived from the transducer may be arranged on attaining some predetermined magnitude to initiate shut down of the reactor automatically.

By way of further illustration of the invention, reference will be made to the accompanying drawings in which:

FIGURE 1 shows diagrammatically a particular embodiment in a sodium-cooled fast nuclear reactor, FIGURES 2 and 3 both show accoustic frequency spectra.

As seen in FIGURE 1, the nuclear reactor has inside a vessel 11 a core 12 composed of fuel element sub-assemblies 13, each such sub-assembly having an outer casing in which are carried a large number of sheathed fuel rods (not seen in drawing) extending longitudinally of the casing in spaced parallel relationship. At their lower ends the casings have laterally apertured extensions 14 which project into a framework 15 for support of the sub-assemblies. This framwork forms an inlet plenum 16 to which sodium coolant is delivered through pipes 17, and by way of the lateral apertures in the casing extensions the coolant is forced upwardly through the spaces between the fuel rods. Having passed through the core, the coolant leaves the vessel 11 through the inner duct 18 of coaxial ducting 19 for passage to heat exchangers (not shown). The pipes 17, by which the coolant is returned, pass through the outer duct of the coaxial ducting.

For each fuel element sub-assembly 13 there is an instrumentation tube 20 which penetrates through a top shield 21 of the vessel and terminates at the upper end of the respective sub-assembly. Included within each such tube is a sound guide which is a hollow or solid metal rod 22 seen in FIGURE 1 to extend beyond the upper open end of the instrumentation tube 20. The other end of this rod is exposed directly to the sodium coolant. In its simplest form, the rod has mounted on it externally of the vessel a piezoelectric or other suitable vibration transducer 23 which is connected electrically through an amplifier 24 and a band pass filter 25 to a trip amplifier 26. Whereas such a simple sound guide would transmit sonic waves by longitudinal vibration, an alternative is to arrange for transmission by transverse vibration; this alternative may be carried into effect by welding a pair of resonating cylinders one to either end of the guide rod. Sonic waves incident on the submerged cylinder set up vibrations in the radial mode and these vibrations are transmitted as transverse vibration to the other cylinder. With the alternative, advantage can be gained more easily from the feature of tuning by shape to the selected bubble formation frequency since the cylinders can be designed to have a natural frequency of vibration in the region of the selected frequency thereby giving a dynamic magnification and a degree of frequency selectivity which may serve as a substitute for the use of a band pass filter.

The transducer in the present case is a lead zirconate transducer screwed into the end of the sound guide rod.

The spectrum of FIGURE 2, which is a plot of sonic wave amplitude against frequency, is that obtained from an actual operating fast reactor, more specifically, the fast reactor at Dounreay, Scotland with the primary sodium/potassium coolant flow at 80% of the full rate. The spectrum of FIGURE 3 is that obtained experimentally from sodium undergoing nucleate boiling in contact with a heater shaped to simulate a fuel rod. Although the FIGURE 3 spectrum shows clearly defined peaks at about 50 and 100 c.p.s. it will be appreciated by a comparison with the FIGURE 2 spectrum that the reactor background noise would be excessively competitive in the region of these two peaks. However, the peak at about 1000 c.p.s. in FIGURE 3 is well clear of competitive background noise. It is therefore to be assumed for the present example that the filter 25 passes a band with of, say, 200 c.p.s. centred on 1000 c.p.s. Another potentially useful peak appears in the FIGURE 3 spectrum at about 3000 c.p.s. and makes available a second choice.

If, at any point in the core of the reactor of FIGURE 1, the flow of sodium coolant diminishes because of some blockage between fuel rods, it is likely that the coolant at this point will begin to boil. These beginnings of boiling give rise to the spectrum of FIGURE 3. Since propagation of these sonic waves is to some extent directional, the reception of the selected peak in the detector above the fuel element subassembly in which the boiling is taking place will be more intense than in the other detectors. This difference of intensity will be sufficient for a decisive determination of the originating subassembly. The trip amplifier 26 effectively registers the transducer output and may be arranged to initiate an alarm or an automatic shut down of the reactor in response to a magnitude of the output corresponding boiling in the associated sub-assembly.

It has been found that an acoustic spectrum peak also occurs at about 1000 c.p.s. for nucleate boiling in water; its occurrence may also be assumed for molten sodium base alloys.

Although reference is made herein to "sonic waves," it is to be understood for the avoidance of doubt that this term is not restrictive to waves in the audio range.

What I claim is:

1. A method of detecting channel blockage in a liquid metal cooled nuclear reactor of the kind having within a vessel a reactor core composed of fuel rods in channels through which the liquid metal coolant flows, comprising the steps of sensing sonic vibrations occurring in all of a number of rods respectively having free ends in the channels to act as sound guides, and selecting from said vibrations those that are characteristic of the formation of bubbles in the liquid metal coolant yet free from interference of competitive strength by sonic waves of other origin, whereby such selected vibrations indicate, for whichever channel is associated with the rod at which these selected vibrations are sensed, that in that channel a boiling of the coolant is taking place and hence that a blockage has occurred.

2. In a liquid metal cooled nuclear reactor of the kind having within a vessel a reactor core composed of fuel rods in channels through which the liquid metal coolant flows, a channel blockage monitoring system comprising in respect of each channel a rod having a free end thereof in the respective channel to act as a sound guide exposed directly to the liquid metal coolant, an electro-acoustic transducer coupled to each rod remote from the said free end, means rendering an output from each said transducer selective to a sonic vibration frequency which is characteristic of the formation of bubbles in the liquid metal coolant yet free from interference of competitive strength by sonic waves of other origin, and means to register such selective outputs separately for the respective channels, whereby the registration of an output indicates, for whichever channel is associated with the rod from which the output originates, that in that channel a boiling of the coolant is taking place and hence that a blockage has occurred.

References Cited by the Examiner

UNITED STATES PATENTS 2,614,645   10/1952   Wilhelm _____ 73—69 X

OTHER REFERENCES

IDO-16118, AEC Document, Aug. 10, 1953, pp. 5, 6, 10, 11, 20, 21 and 22.

REUBEN EPSTEIN, *Primary Examiner.*

CARL D. QUARFORTH, *Examiner.*